United States Patent [19]
Elonen et al.

[11] Patent Number: 5,141,535
[45] Date of Patent: Aug. 25, 1992

[54] APPARATUS FOR SEPARATING GAS FROM A SUSPENSION

[75] Inventors: Jorma Elonen, Jamsankoski; Lehtinen, Jouni, Kouvola, both of Finland

[73] Assignee: A. Ahlstrom Corporation, Noormarkku, Finland

[21] Appl. No.: 650,032

[22] Filed: Feb. 4, 1991

[30] Foreign Application Priority Data

Feb. 2, 1990 [FI] Finland ................................ 900525

[51] Int. Cl.$^5$ ............................................. B01D 45/12
[52] U.S. Cl. ....................................... 55/199; 55/203; 415/169.1; 415/169.2
[58] Field of Search ................. 210/787, 512.1, 512.2, 210/512.3, 188; 55/199, 202, 203, 204; 415/169.1, 169.2

[56] References Cited

U.S. PATENT DOCUMENTS

| | | | |
|---|---|---|---|
| 3,102,491 | 9/1963 | Adams | 210/188 |
| 3,597,904 | 8/1971 | Jakobsson et al. | 55/408 |
| 3,715,863 | 2/1973 | Zanoni | 55/204 |
| 4,222,751 | 9/1980 | Shunta | 55/204 |
| 4,435,193 | 3/1984 | Gullichsen et al. | 55/203 |
| 4,447,189 | 5/1984 | Jensen et al. | 415/169.1 |
| 4,799,940 | 1/1989 | Milikan | 55/52 |
| 5,000,766 | 3/1991 | Yano et al. | 55/204 |
| 5,017,198 | 3/1991 | Schieg et al. | 55/203 |

FOREIGN PATENT DOCUMENTS

| | | | |
|---|---|---|---|
| 3105914A1 | 9/1982 | Fed. Rep. of Germany | 55/199 |
| 119733 | 6/1970 | Norway | 55/199 |

OTHER PUBLICATIONS

Cheremisinoff, Fluid Flow Pumps, Pipes, and Channels 1981 pp. 255-256, 265-267, and 271-274.

Primary Examiner—Ernest G. Therkorn
Attorney, Agent, or Firm—Cohen, Pontani, Lieberman & Pavane

[57] ABSTRACT

A method of and an apparatus for separating gas from a gas containing suspension, generally a liquid medium, which may contain solid material, such as fibers in the pulp and paper industry. At least a portion of the suspension is first subjected to the centrifugal action of a centrifugal pump and then to further centrifugal separation of a centrifugal separator so as to divide the suspension at least once into two fractions, of which the heavier fraction containing less gas is discharged from the apparatus and the lighter fraction containing more gas is returned back to the suction side of the centrifugal pump.

The apparatus is characterized in that the casing of the centrifugal pump is connected to a centrifugal separator for dividing the suspension into two fractions, the separator having a conduit for the discharge of the heavier fraction from the separator and a conduit for returning the lighter fraction to a channel leading to the suction side of the pump.

10 Claims, 3 Drawing Sheets

5,141,535

APPARATUS FOR SEPARATING GAS FROM A SUSPENSION

FIELD OF THE INVENTION

The present invention relates to a method of and an apparatus for separating gas from a gas containing suspension. The term suspension in this context refers generally to a liquid medium, which can include some solid material(s), such as fibers. It is understood that the term gas includes vapor. The method and apparatus in accordance with the present invention can be utilized in the pulp and paper industry for separating gas from gas containing fibrous sludges and filtrates.

BACKGROUND OF THE INVENTION

Many different methods and apparatus for separating gas from liquids are known. Most literature on such gas/liquid separation relates to the separation of vapor from gasoline. Very often such publications relate to gas/vapor separation in aircraft fuels. Most devices utilize the known characteristic of centrifugal pumps to separate gaseous medium from the pumped liquid which may otherwise result in a poor performance and uneven operation of the pump. Devices have been developed to cooperate with such kind of pumps for guiding the gas from a location in front of the impeller to a gas discharge without causing any disturbance in the operation of the pump. Relevant examples of this kind of apparatus are, e.g. SE Patent 202 830 and U.S. Pat. Nos. 3,271,933; 3,276,187; 3,290,864 and 4,201,555. These publications relate to a single-stage gas separation, whereby gas is separated from a liquid at least to such an extent that the residual gas will not disturb the pumping process. In some cases the main purpose of the process in addition to pumping is gas discharge, but the centrifugal pump is not able to separate, in one stage, all of the gas contained in the suspension being pumped.

In the pulp industry, however, the presence of air or other gas in the fiber suspension disturbs the proper treatment of suspension, for example, in washing and bleaching processes. At least prior to the paper machine the suspension flow is therefore guided to a large vessel, which is subjected to a reduced pressure for separating the gases in the suspension by permitting the gas to emerge as bubbles at the surface of the suspension in the vessel. Such a vessel is disclosed, for example, in U.S. Pat. No. 2,642,950. On the other hand, oversized storage vessels are also known, for collecting, for example, the filtrate from washers and paper machines. These filtrates will settle in the vessel, and permit the entrained gases to separate and to emerge as bubbles at the surface thereof. Chemicals are also used to prevent foaming as well as any harmful effects of the gas in the liquid.

All these gas discharge methods are not free from problems. Large vessels, both storage vessels and gas discharge vessels require a large amount of space and due to the large size, are very expensive. On the other hand, the emissions from these vessels are harmful, since the gases separated from the filtrate or suspension are rarely clean or pure air, but mostly contain large amounts of chemical vapors. Furthermore, different chemicals, which are used for minimizing the foaming problem, cause environmental damage, because they are entrained in the waste water and easily flow into the sewer system therewith.

SUMMARY OF THE INVENTION

The present invention relates to a gas separation apparatus which eliminates the above described large or environmentally harmful apparatus and methods. The apparatus of the present invention is intended to cooperate with a centrifugal pump preferably a centrifugal pump with means for separating gas. The apparatus in accordance with our invention is small in size and thus easily fitted into both new and existing plants. At least a portion of the suspension is subjected by a centrifugal pump to a centrifugal separation in the pump and is then forwarded by the centrifugal pump for further centrifugal separation into a centrifugal separator which may be part of the pump. The suspension is divided at least once into two fractions, of which the heavier portion or fraction containing less gas is discharged from the apparatus and the lighter portion or fraction containing more gas is returned to the suction side of the centrifugal pump.

The apparatus in accordance with the present invention is further characterized in that the casing of the centrifugal pump is connected to a centrifugal separator for dividing the suspension into two fractions, said separator having a conduit for the discharge of the heavier fraction from the separator and a conduit for returning the lighter fraction to a channel leading to the suction side of the pump.

BRIEF DESCRIPTION OF THE DRAWINGS

The apparatus in accordance with the present invention are described below in more detail, by way of example, with reference to the accompanying drawings, in which.

DETAILED DESCRIPTION OF THE PRESENTLY PREFERRED EMBODIMENT

Figure 1:
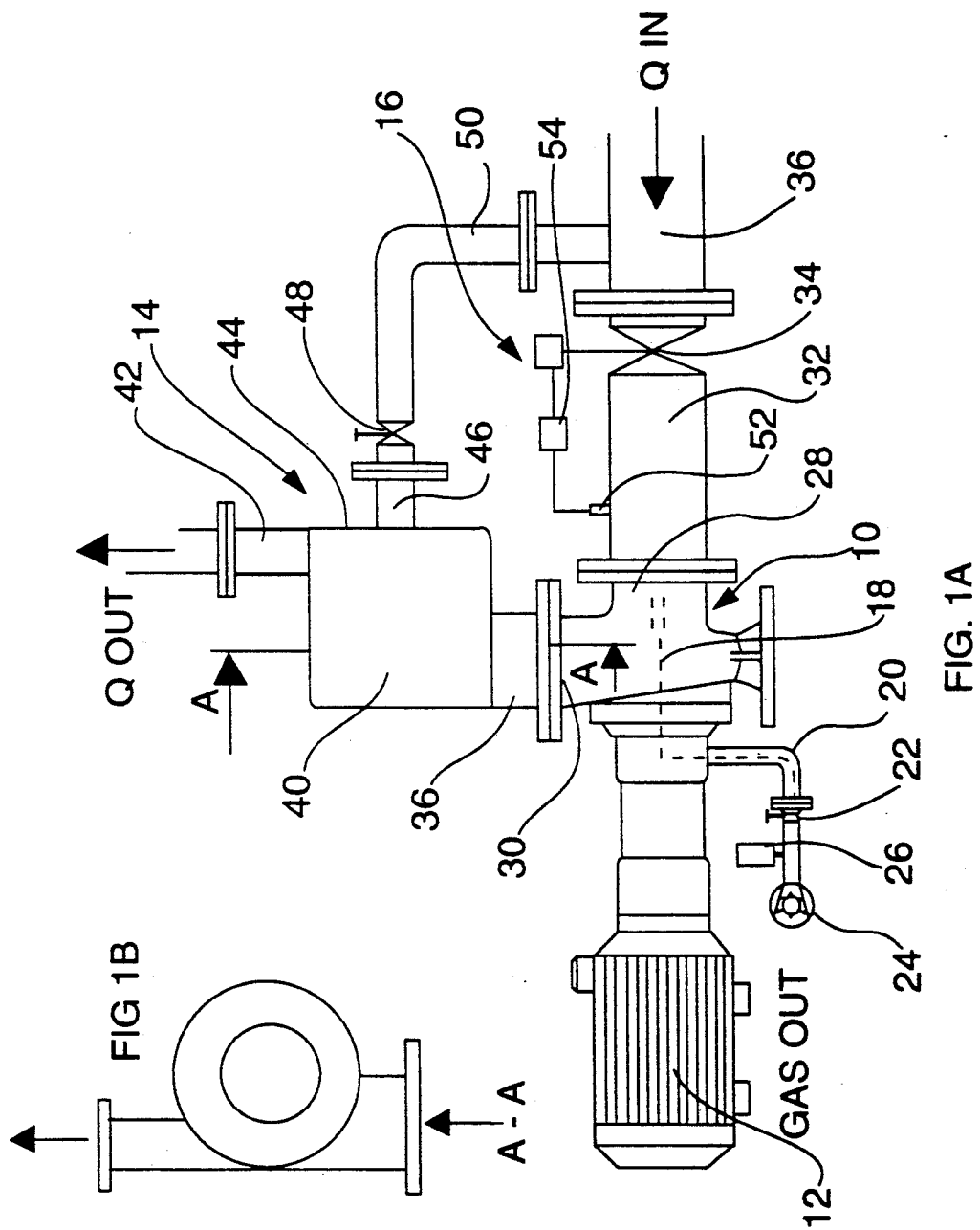
FIG. 1A is a schematic illustration of an apparatus in accordance with a first embodiment of the invention.
FIG. 1B is a cross-sectional view along line A—A in FIG. 1.

As shown in FIG. 1 the apparatus in accordance with the present invention mainly comprises a centrifugal pump 10, a means 12 for driving the pump, a gas discharge unit 14 of a centrifugal type separator and a control circuit 16. As the centrifugal pump 10 is preferably of the gas separating type the drawing schematically illustrates a gas discharge system of pump 10. The system comprises a channel 18 within the pump, which channel is connected to an exterior gas discharge pipe 20, which is connected by a valve 22 to a suction pump 24, which can be, for example, a so-called Nash-pump. The drawing also schematically illustrates a control valve 26 for controlling the reduced pressure generated by suction pump 24. The centrifugal pump 10 has, as is known, a suction opening 28 and a pressure opening 30. A suction duct 32 is mounted to the suction opening. The duct 32 is connected by a valve 34 to the inlet pipe 36 for the suspension.

A gas discharge unit 14 is connected by a pipe 38 to the pressure opening 30 of the centrifugal pump 10. The gas discharge unit 14 comprises a cylindrical chamber 40, which is tangentially joined by pipe 38 and discharge pipe 42 (FIG. 1B). Pipe 38 for the inflowing suspension is located at the opposite end of chamber 40 relative to the discharge pipe 42 for the suspension. Side 44 of chamber 40 on the side of the discharge pipe 42 is provided with another discharge pipe 46 for the gas containing fraction. Pipe 46 is located in the middle of the side 44 and is connected by valve 48 to a conduit 50 leading to the inlet pipe 36 for the suspension. The control circuit 16 comprises a pressure sensor 52 connected to the suction duct 32 and a control unit 54, which is connected to valve 34 to regulate the operation of said valve.

The described apparatus operates in such a way that the suspension being treated is drawn by pump 10 via suction duct 32 through valve 34 from inlet pipe 36. The flow is constricted by valve 34 in such a way that a reduced pressure is generated in the suction duct and in the suction opening 28 of the pump, facilitating the separation of gas from the suspension. Pressure sensor 52 in control circuit 16 and control unit 54 maintain the pressure in the suction duct sufficiently high to prevent the suspension from boiling due to the reduced pressure. In this manner the amount of gas separated from the suspension in front of the impeller is as great as possible and the separated gas is discharged from the centrifugal pump 10 via the conventional route. Thus centrifugal pump 10 is pumping suspension through pressure opening 30 and the gas content of said suspension is considerably lower than that of the suspension in the inlet pipe 36.

The suspension is then supplied tangentially into gas discharge chamber 40 from pressure opening 30 via pipe 38. When the suspension circulates at a high speed along the wall of the chamber 40, gas will separate from the suspension and will travel to the center of the chamber as the suspension is forced by the pressure against the wall due to the centrifugal force. The rapidly circulating suspension is then discharged from the chamber 40 into discharge pipe 42 and the gas or the fraction containing large amounts of gas is discharged from chamber 40 via gas discharge pipe 46. Since there is little gas remaining in the suspension when the suspension enter gas discharge chamber 40, it is likely that not much clean gas is separated therein. However, the suspension flow is continuously adjusted with valve 48 to be very low in order to maximize the gas separation. The gas containing suspension flow is supplied back to the inlet pipe 36 and added to the main suspension flow so that is again subjected to both the separation in the pump 10 and the centrifugal separation in the gas discharge chamber 40.

Figure 2:
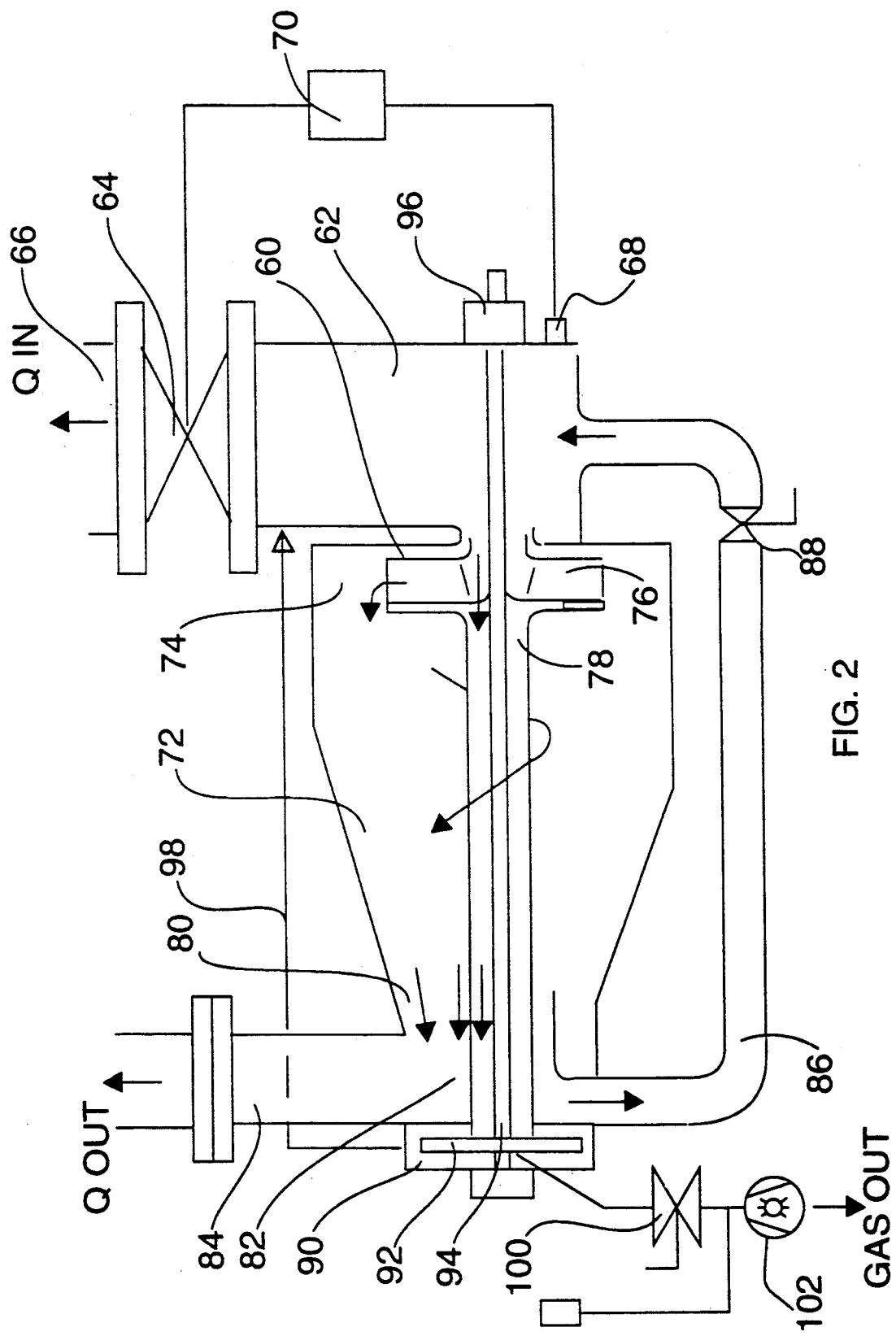
FIG. 2 is a schematic illustration of an apparatus in accordance with a second embodiment of the invention.

FIG. 2 illustrates a second embodiment of the present invention, which also utilizes a gas discharging centrifugal pump 60. The suction side of pump 60 is provided with a chamber 62, which is connected by a valve 64 to an inlet pipe 66 for the suspension. Valve 64 is adjusted in the above described way by a pressure sensor 68 and a control unit 70. The pressure opening of centrifugal pump 60 is connected to inlet end 74 of a gas discharge cyclone 72 arranged at the back side of the pump relative to the suction opening of the pump, or as is shown in the FIG. 2, the casing of pump 60 is radially open for leading the suspension radially to the inlet end 74 of the cyclone. However, the separated gas containing fraction is moved along channel 78 in front of the impeller and led to the opposite or downstream end 80 of the cyclone. Due to the centrifugal force, the lightest fraction, i.e. the gas containing fraction of the suspension circulating in cyclone 72 will collect centrally about the outside wall of channel 78, and from there flow to a separate annular channel 82 at the end 80 of cyclone 72. The substantially gas free, heavy fraction circulating in cyclone 72 is discharged from the apparatus through a conduit 84 at end 80 of the cyclone. The lighter, gas containing fraction which flowed from the cyclone to the annular channel 82 is led along pipe 86 through a valve 88 to a chamber 62 in front of pump 60, wherefrom it can again enter the pump and be subjected to the gas discharge process. The gas containing fraction, which has been discharged from in front of the impeller and which travelled along the inside of channel 78 is guided to a chamber 90, which has an impeller 92 mounted for rotation therein, and which impeller is preferably mounted on a shaft 94 connected to the same drive means 96 for impeller 76 of pump 60. The purpose of impeller 92 separate the suspension from the medium which may possibly have flowed along channel 78 and to return it from chamber 90 via pipe 98 to chamber 62 in front of pump 60 to be again subjected to the gas discharge process. Clean gas is led from chamber 90 by a valve 100 to a suction device 102 and vented. The operation of this apparatus substantially corresponds to the operation of the embodiment of FIG. 1.

Figure 3:
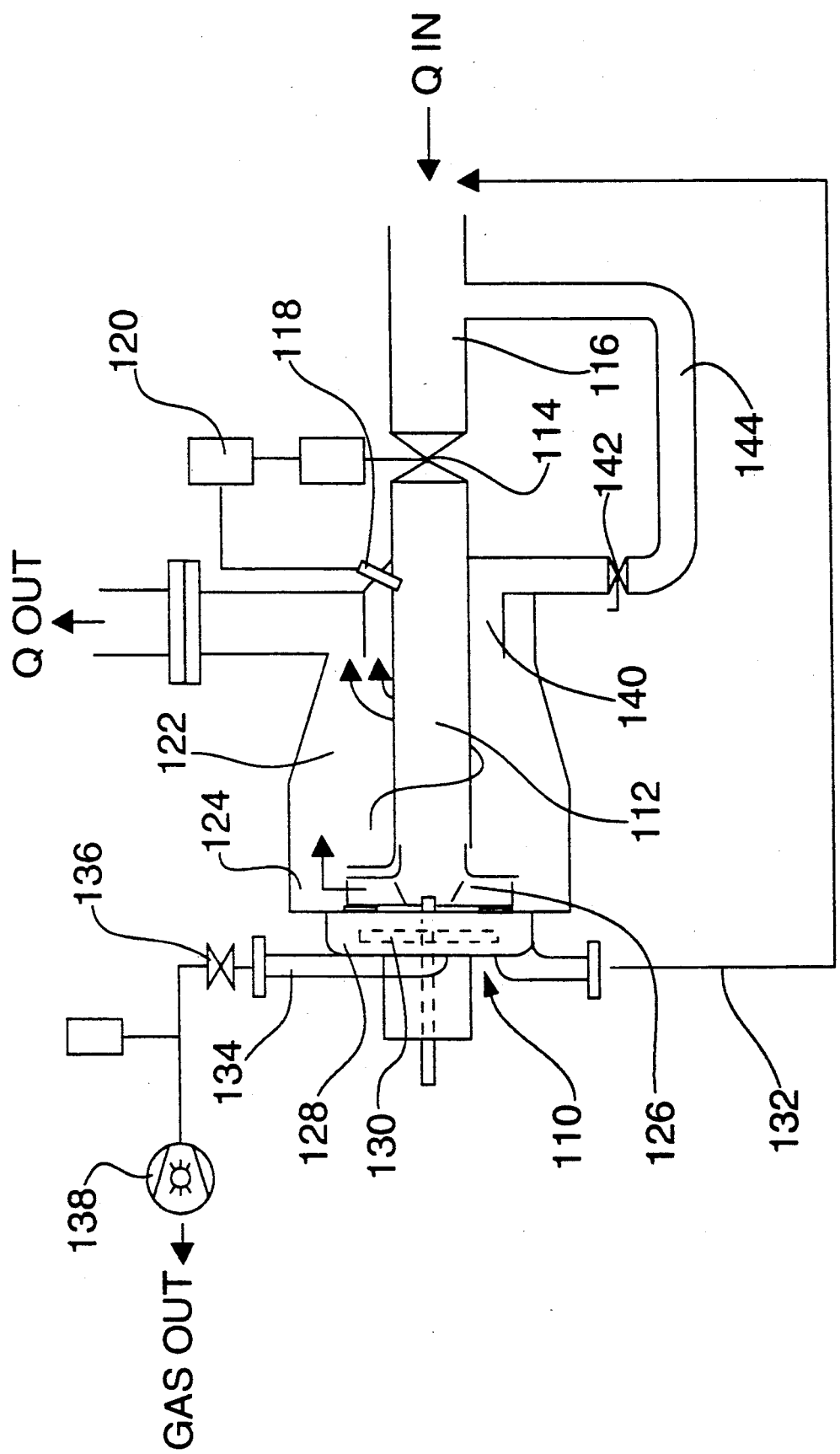
FIG. 3 is a schematic illustration of an apparatus in accordance with a third embodiment of the invention.

The apparatus of FIG. 3 is also based on utilizing a gas discharging centrifugal pump 110. The suspension to be treated is supplied to centrifugal pump 110 through a suction duct 112, a valve 114 and an inlet pipe 116. The operation of valve 114 is regulated according to the signals given by pressure sensor 118 to control unit 120 in a similar manner as in the other embodiments. The pressure opening of centrifugal pump 110 may be either connected to the inlet end 124 of cyclone 122 tangentially or, as in the drawing, the shell of the centrifugal pump 110 is radially open and feeds the suspension radially to the inlet end 124 of the cyclone 122. The gas separated in front of impeller 126 of centrifugal pump 110 is discharged through the openings of impeller 126 to a chamber 128 on the back side of the impeller, in which a secondary impeller 130 separates the liquid suspension from gas and returns the suspension along pipe 132 to inlet pipe 116 of the suspension. The gaseous fraction again is conventionally discharged from the apparatus through a pipe 134, a valve 136 and a suction duct of pipe 138. Since in this embodiment the gas discharge cyclone 122 is arranged on the same side of the casing as suction duct 112, the light, gas containing fraction of the suspension circulating in the cyclone accumulates at the vicinity of the outer surface of suction duct 112, wherefrom it is discharge to an annular channel 140, which is connected to inlet pipe 116 for the suspension by a value 142 and a pipe 144. Thus, the lighter fraction is returned from the cyclone back to the inlet to be re-introduced into the gas discharge apparatus. the heavier fraction circulating along the outer wall of cyclone 122 is discharged from the apparatus through a conduit 146.

As can be seen from the above description, a new kind of gas discharge system has been developed, which can be utilized more effectively than heretofore known apparatus for discharging gas from the material being pumped. However, the above described three embodiments are merely given to exemplify the invention and are not intended restrict the present invention to the illustrated embodiments. Thus the scope of the present invention is limited only by he accompanying claims.

It is also understood that further changes and modifications within the scope of the claims may be made. For example, the pressure sensor may be a temperature sensor or alternatively, some other device, which is able to detect the vaporization of the liquid one way or the other.

What is claimed is:

1. An apparatus for separating gas from a gas containing liquid suspension comprising:

a centrifugal pump having a suction inlet, a housing and an impeller rotatably mounted within said housing: and a gas discharging means connected to said centrifugal pump for discharging gas therefrom: said gas discharge means comprising a centrifugal separator connected to said centrifugal pump for dividing suspension into a first relatively heavier fraction and a second relatively lighter fraction, said centrifugal separator comprising a first conduit for discharging said heavier fraction from said separator and a second conduit for returning said second relatively lighter fraction to said suction inlet of said centrifugal pump; and conduit means to channel gas to an exterior location.

2. The apparatus according to claim 1, wherein said centrifugal separator (72,122) comprises an inlet end (74,124); and said centrifugal pump (60,110) being located within said centrifugal separator so that said centrifugal separator inlet end (74,124) is forming at least part of said pump housing.

3. The apparatus in accordance with claim 2, wherein said centrifugal separator (14,72,122) is a cyclone separator having an inlet end (74,124) and a discharge end (80) and being tapered from said inlet end (74,124) towards said discharge end (80).

4. The apparatus according to claim 2, wherein said centrifugal separator (122) is arranged around said suction inlet side of said pump (110).

5. The apparatus in accordance with claim 2, wherein said centrifugal pump has a back opposite said suction inlet, and said centrifugal separator (72) is arranged around said back side of said pump (60) relative to said suction inlet of said pump (60).

6. The apparatus according to claim 5, wherein said centrifugal separator includes a discharge end (80); said apparatus additionally comprising a a fractionating means for dividing said lighter fraction, said fractionating means arranged to communicate with said discharge end (80) of said centrifugal separator (72); and wherein said gas discharge means for discharging gas from said centrifugal pump (60) includes an axial channel (78) for guiding said lighter fraction separated in siad pump (60) to said fractionating means for dividing said lighter fraction into a gaseous fraction and a liquid fraction.

7. The apparatus according to claim 5, wherein said centrifugal separator has an inlet end and a discharge end; said apparatus further comprising an annular channel (82) arranged coaxially within said discharge end of said centrifugal separator (72) for leading said lighter fraction into said second conduit (86) toward said suction inlet of said pump (60).

8. The apparatus according to claim 1, wherein said centrifugal pump (10) has a pressure opening (30) and wherein said centrifugal separator (14) is tangentially connected to said pressure opening (30) of said pump (10).

9. The apparatus according to claim 8, wherein said centrifugal separator (14,72,122) is a cyclone separator having an inlet end (74,124) and a discharge end (80) and being tapered from said inlet end (74,124) towards said discharge end (80).

10. The apparatus according to claim 1, additionally comprising a valve (34,64,114) communicating with said suction inlet and means for controlling said valve in response to at least one of pressure and temperature in said suction inlet.

* * * * *